United States Patent [19]

Bradshaw et al.

[11] Patent Number: 5,090,982
[45] Date of Patent: Feb. 25, 1992

[54] METHOD OF PRODUCING A SURFACE MICROSTRUCTURE ON GLASS

[75] Inventors: John M. Bradshaw, Chorley; Richard Gelder, Preston, both of United Kingdom

[73] Assignee: Pilkington plc, Merseyside, England

[21] Appl. No.: 476,399

[22] PCT Filed: Dec. 2, 1988

[86] PCT No.: PCT/GB88/01080

§ 371 Date: Jun. 1, 1990

§ 102(e) Date: Jun. 1, 1990

[87] PCT Pub. No.: WO89/05507

PCT Pub. Date: Jun. 15, 1989

[30] Foreign Application Priority Data

Dec. 3, 1987 [GB] United Kingdom ............... 8728272

[51] Int. Cl.$^5$ ............................................. C03B 35/00
[52] U.S. Cl. ........................................ 65/24; 65/60.1; 65/60.5; 65/106; 369/275.4
[58] Field of Search ............... 65/24, 60.1, 60.5, 60.6, 65/111, 112, 105, 106, 166, 319; 369/275.1, 275.4

[56] References Cited

U.S. PATENT DOCUMENTS

| | | | |
|---|---|---|---|
| 4,282,268 | 8/1981 | Priestley et al. | 427/40 |
| 4,297,417 | 10/1981 | Wu | 501/69 |
| 4,417,331 | 11/1983 | Takaoka et al. | 369/275.4 |
| 4,522,846 | 6/1985 | Mayer et al. | 427/53.1 |
| 4,544,443 | 10/1985 | Ohta et al. | 156/643 |
| 4,655,876 | 4/1987 | Kawai et al. | 156/643 |
| 4,658,393 | 4/1987 | Ohta et al. | 369/284 |

FOREIGN PATENT DOCUMENTS

| | | |
|---|---|---|
| 57-163536 | 10/1982 | Japan . |
| 59-171629 | 9/1984 | Japan . |
| 61-194663 | 8/1986 | Japan . |
| 62-75951 | 4/1987 | Japan . |
| 8809990 | 12/1988 | World Int. Prop. O. . |

*Primary Examiner*—Richard V. Fisher
*Assistant Examiner*—John J. Bruckner
*Attorney, Agent, or Firm*—Burns, Doane, Swecker & Mathis

[57] ABSTRACT

A method to produce a microstructure on glass which is of excellent quality and allows for repeated use of a stamper. The method comprises heating the glass to a surface temperature corresponding to a log viscosity between about 13 to 8 poise, supporting the glass and impressing it with the stamper heated to about the same temperature as the glass so that a microstructure on the heated stamper will deform the surface of the glass to give a corresponding microstructure on the surface of the glass, which when separated from the stamper and cooled in a controlled manner gives the desired surface microstructure on the glass. The method is particularly suitable for forming tracking grooves on optical disk substrates.

29 Claims, No Drawings

METHOD OF PRODUCING A SURFACE MICROSTRUCTURE ON GLASS

This invention relates to a method of producing a surface microstructure on glass, particularly to a method of producing tracking grooves on the glass substrate for an optical memory element. The invention also relates to glass articles produced by the method according to the invention, particularly optical memory disk substrates and optical memory disks having tracking grooves.

Optical memory systems have been developed which store information in high density. The high density is achievable by using a beam diameter of approximately 1 micron. However, the beam position needs to be accurately controlled so that information is recorded at a pre-determined position and the information is read out from a pre-selected position. Certain types of optical memory devices require the use of guide signals or guide addresses to control the optical beam position. Typically these take the form of microscopic grooves, which in conjunction with a sensing mechanism and a servo system operating upon the optical beam, serve to guide the beam in the correct direction during recording and reading operations. Various methods for forming the grooves on the optical memory element have been proposed. In one such known method a nickel stamper having a corresponding pattern of grooves formed upon its surface is used to shape a photopolymer which is interposed between the stamper and a substrate made of glass or acrylic. A UV curable acrylic resin is often used as the photopolymer and is cured by exposure to light through the glass or acrylic substrate. Removal of the stamper then leaves a substrate having a thin acrylic layer fixed to it in which there is a micro structure. In a more simplified version of this procedure the stamper is used to form a surface having a microstructure by injection moulding acrylic or polycarbonate resin into a mould of which the stamper forms part. Both methods employ a resin layer in the optical memory element which introduces a possibility of oxygen and moisture permeation into the recording medium via the resin layer. Such permeation is thought to deteriorate modern recording materials and it is therefore considered desirable to form the tracking grooves directly on a glass substrate.

U.S. Pat. No. 4,544,443 assigned to Sharp KK describes a proposed method for forming the tracking grooves directly on a glass substrate. It is suggested that an optical memory element may be manufactured by depositing a resist film on the glass substrate and forming a groove pattern in the resist film. Reactive ion etching is conducted through the groove pattern formed in the resist film so as to form the tracking grooves in the glass substrate. After removing the resist film from the glass substrate, a magneto-optical recording layer is formed on the glass substrate in a conventional manner. In a preferred embodiment of the invention a layer of silica is deposited on the glass substrate and the grooves are actually formed in the silica layer. This preferred embodiment reveals the practical difficulties in forming grooves in glass by means of an etching process, irrespective of the cost penalties of using such a process. The stated disadvantages of glass etching are groove depth control and slow processing. Using a silica layer is expensive and probably not much faster.

Throughout this specification references to tracking grooves should be understood to include header data and other information permanently recorded in the microstructure. Furthermore, tracking grooves may be continuous or discontinuous, spiral or circular or any other configuration or combination desired.

The standards for optical disks are laid down in draft ISO 9171. This standard includes a specification for the various limits allowed for tracking groove geometry.

The present invention seeks to provide a method for forming the tracking grooves directly in the glass surface without the need to use an etching process and in an economical manner which uses a minimum of process steps. In addition to forming tracking grooves on the surface of an optical disk substrate, those skilled in the art will readily appreciate that the invention is applicable to the formation of any similar surface microstructure on glass including similar super-cooled liquids.

According to one aspect of the present invention a method of producing a surface microstructure on glass is characterised in that the glass is heated to a surface temperature corresponding to a log viscosity between about 13 to 8 poise, the glass is supported and then pressed with a stamper heated to above the temperature of the glass, so that a microstructure on the heated stamper deforms the surface of the glass to give a corresponding microstructure which, when separated from the stamper and cooled in a controlled manner, gives the desired surface microstructure on the glass.

According to another aspect of the present invention there is provided a method of producing a surface microstructure on glass characterised in that the glass is heated to a surface temperature corresponding to a log viscosity between about 13 to 8 poise, the glass is supported and then pressed at a pressure greater than 120 kg per square cm with a stamper heated to within ±10° C. of the temperature of the glass, so that a microstructure on the heated stamper deforms the surface of the glass to give a corresponding microstructure which, when separated from the stamper and cooled in a controlled manner, gives the desired surface microstructure on the glass.

According to a further aspect of the present invention there is provided a method of producing a surface microstructure on glass characterised in that glass is coated and is heated to a surface temperature corresponding to a log viscosity between about 13 to 8 poise, the glass is supported and then pressed with a stamper heated to within ±10° C. of the temperature of the glass, so that a microstructure on the heated stamper deforms the surface of the glass to give a corresponding microstructure which, when separated from the stamper and cooled in a controlled manner, gives the desired surface microstructure on the glass.

A non-metallic stamper may be used.

The stamping operation is preferably carried out in a substantially oxygen free atmosphere. The oxygen free atmosphere may be obtained by use of vacuum, by use of an inert gas such as argon, or by use of a reducing atmosphere such as a 10% hydrogen nitrogen mixture. Preferably an oxygen level of less than 0.3% is used. Coated glass may also be used if it is desired to re-use the stamper a number of times. The coating may be a layer which substantially prevents ion diffusion and may also act as a lubricant. Silica or carbon may be used as coatings.

The stamper may be separated from the glass before any substantial cooling of the glass occurs. Alternatively the stamper may be cooled in contact with the glass provided a stamper material is chosen with a thermal expansion co-efficient which matches that of the glass.

The stamper may be pressed into the glass so that the glass substantially conforms to the microstructure on the stamper surface, or the stamper may be pressed into the glass so that the microstructure formed on the surface of the glass conforms to the microstructure on the stamper across the area of the glass, but does not fully conform to the depth of the microstructure, for example the galss may flow into a deep groove in the stamper to give a shallow protrusion on the glass. The extent of flow of the glass into the groove on the stamper can be controlled to within ±10% by careful selection of the pressing conditions.

The stamper may be heated to a temperature within 10° C. of the temperature of the surface of the glass or it may be heated to a temperature which is higher than the temperature of the surface of the glass. Desirably the surface temperature of the glass corresponds to a log viscosity between about 11 to 9.5 poise. Advantageously a pressure of greater than 120 kg per square cm is used. Most advantageously a pressing time of less than 2 minutes is used.

Also according to the present invention there is a method of producing an optical disk substrate having tracking grooves from a pre-formed sheet of flat thin glass characterised in that the glass is heated to a temperature corresponding to a log viscosity between about 13 to 8 poise, supported in a substantially oxygen gree atmosphere and impressed with a stamper heated to within ±10° C. of the temperature of the glass for a predetermined time and at a predetermined pressure, so that a microstructure on the heated stamper deforms the surface of the glass to give a corresponding microstructure on the surface of the glass, whereupon the glass is separated from the stamper before any substantial cooling occurs and cooled in a controlled manner to give the desired tracking grooves on the optical disk substrate. A non-metallic stamper may be used. Advantageously the glass is coated glass. The coating may be a layer which substantially prevents ion diffusion, such as silica, and it may also act as a lubricant, such as carbon. The process may include the further step of toughening the optical disk substrate. When chemically strengthenable glass is used the toughening may be carried out by chemical means.

The thickness of the glass is preferably in the range from about 1 to 2 mm. The temperature of the stamper controlled to within ±10° C. of the temperature of the surface of the glass at the time of pressing. The pressure with which the stamper is impressed into the glass is preferably greater than 120 kg per square cm. The microstructure produced on the surface of the hot glass is not necessarily the same microstructure as that on the surface of the hot stamper, but the pressing conditions are maintained so that the microstructure produced on the surface of the hot glass is controllably repeatable to within ±10% of the shape of other grooves produced by the same stamper. Desirably an oxygen level of less than 0.3% is used.

The invention will now be described by way of example only:

For our examples we used a thin sheet glass which is available from Flachglas AG and is already used as a substrate for optical disk manufacture. The composition of this glass is typically:

| | |
|---|---|
| $SiO_2$ | 73.5 wt % |
| $Al_2O_3$ | 0.98 |
| $Fe_2O_3$ | 0.091 |
| $TiO_2$ | 0.036 |
| CaO | 5.45 |
| MgO | 4.417 |
| $Na_2O$ | 15.043 |
| $K_2O$ | 0.307 |
| $SO_3$ | 0.166 |

The glass is between 1 and 2 mm thick and is chemically toughenable which is currently a requirement for the manufacture of optical disks.

Other chemical toughenable glass could be used instead of the above glass, for example Corning 0317 which is also a chemically strengthenable thin sheet glass. Non-chemically toughenable glass could be used for other applications, or even for optical disks if desired. Thin float glass could also be used.

Initially, two problems had to be solved. The first was the selection of appropriate stamping conditions and materials to facilitate accurate replication of the stamper's surface microstructure on the surface of the glass; the second was to choose materials and operating conditions which enabled a single stamper to be used repeatedly to produce the surface microstructure on a plurality of glass disks.

A number of the following examples do not specifically exemplify the methods of the present invention but are nevertheless included for illustrative pruposes only.

EXAMPLE 1

A gold-platinum stamper was fabricated by fixing a 750 micron 5% Au sheet to a glass block. A microstructure was formed on the exposed surface of the sheet by scratching it with a diamond tipped tool. Measurement indicated that these scratches had a depth of approximately 0.5 microns. The stamper was mounted in a press above a glass disk. The stamper and the disk were heated by means of an induction heating system for sufficient time to allow the glass disk to reach an equilibrium temperature of 540° C. The stamper was kept in an inert atmosphere whilst hot. The stamper was then pressed into the supported glass disk using a pressure of 60 kg per square cm for a period of 4 minutes. The load was removed from the stamper and the disk allowed to cool. A microscopic examination of the disk showed that the stamper microstructure had not been fully transferred to the glass. The log viscosity of this glass at 540° C. is 13 poises.

EXAMPLE 2

Example 1 was repeated with an equilibrium temperature of 570° C. which corresponds to a log viscosity of 11.5 poises. Again the pressing time was 4 minutes. Examination of the cooled glass disk showed that microstructure transfer was enhanced by the higher temperature.

EXAMPLE 3

Example 2 was repeated with a pressing time of 8 minutes, a further improvement in the quality of the microstructure transferred was observed.

These examples show that the microstructure will not be transferred well if the temperature or pressing time is too low. Further tests showed that deterioration of transfer quality also occurred if the temperature was raised too high. This was thought to be due to the consequent lowering of glass viscosity to below a lower viscosity limit. However, it is believed that the pressing quality is influenced by a combination of pressing pressure, pressing time, the glass temperature. Higher quality transfer can be achieved at low temperature by using high pressure or long pressing times. Conversely, high temperature needs shorter pressing times and/or less pressure.

EXAMPLE 4

A stamper was fabricated with a molybdenum surface. A pyramid marker was used to make a pyramid shape indentation in the molybdenum which had a depth of approximately 6 microns, the base length of the pyramid being 15 microns. It was reasoned that obtaining the correct stamping conditions to cause the glass to flow into the indentation and fill it would probably be a very good indication of the conditions that would be needed for stamping an actual optical disk. The method used was similar to that used for Example 1. The heated stamper was kept in an atmosphere of 10% hydrogen, 90% nitrogen to reduce the oxidation of the molybdenum. Even so some oxidation was thought to be occurring, but this did not present a problem because the oxide layer was volatile and did not build up. The measured temperature of the glass was 600° C. which corresponds to a log viscosity of 10.5 poises. Pressing times of 2, 10 and 20 minutes were used with a pressure of 60 kg/cm$^2$. Examination of the micro-pyramid form on the surface of the glass indicated a steady improvement in the quality of microstructure transfer as the pressing time was increased.

EXAMPLE 5

For this example we deposited titania onto a quartz block. The entire surface was initially coated to a depth of approximately 300 nm, then a mask was used to prevent further deposition on one part of the block whilst a further 200 nm approximately was deposited elsewhere. Examination of the resulting titania microstructure showed a rough step between the two depths of coating. The step was characterised by surface irregularities. This stamper was then pressed into glass with a measured surface temperature of 600° C. An argon atmosphere protected the coating. A glass disk that had been pressed for 2 minutes at a pressure of 60 kg/cm$^2$ was examined together with the stamper. Talystep data after scanning both microstructures confirmed that the stamper configuration had been reproduced in the glass down to features as small as 10 nm.

Good structure transfer was also observed using stamper facings of vitreous carbon. It is believed that dense ceramics are better than porous ones for this application. The next problem was to choose stamper materials and stamping atmospheres which would enable a stamper to be used repeatedly.

EXAMPLE 6

An uncoated quartz stamper was pressed into glass with a measured surface temperature of about 575° C. for 10 minutes in an air atmosphere. The quartz stuck to the glass and could not be re-used.

EXAMPLE 7

A silicon sheet stamper was pressed into a glass disk with a measured surface temperature of 560° C. in air for 2 minutes at a pressure of 60 kg/cm$^2$. The silicon stuck to the glass and broke when it was removed. The test was repeated with 10% hydrogen/nitrogen atmosphere and argon atmosphere but the silicon still stuck and broke on removal.

EXAMPLE 8

Silicon nitride is an established etchable material which can have a grooved microstructure formed on its surface by conventional lithographic techniques. We used a stamper made from a silicon nitride coating on quartz. The quartz broke and the stamper could be not be re-used. A stamper made from isostaticly pressed Si$_3$N$_4$ with an optional further Si-N layer put onto it by chemical vapour deposition would be suitable for this application.

Various other materials and material combinations were made into stampers and pressed into hot glass at a pressure of 60 kg/cm$^2$. The results are summarised in tables 1 and 2 below, table 1 shows materials which could not be used repeatedly and table 2 shows those that could.

TABLE 1

| Example | Material | Conditions (All °C.) | Assessment |
|---|---|---|---|
| 9 | Quartz | 560/2 min 590/10 min | Quartz stuck and broke. |
| 10 | Tin oxide coating on Quartz | up to 650/ 2 min | Stuck. Quartz broke. |
| 11 | Gold foil (25μ mm thick) | up to 570/ 2 min | Foil distorts (very soft) |
| 12 | Gold film (on Quartz and primer) | up to 560/ 2 min | Film comes off Quartz. Not stuck. |
| 13 | Carbon films on Quartz | 570/2 min | Films burn off. |
| 14 | Chromium film on Quartz | 570/4 min | Some film transfer to glass. Some sticking. Quartz breaks. |
| 15 | Ti—N film on Quartz | 610/2 min | Coating partially coming off. |
| 16 | Nickel sheet | 610/4 min | Stuck. Glass broke. |

TABLE 2

| Example | Material | No. of times pressed | Top temperature (as set) | Non-Stick Properties |
|---|---|---|---|---|
| 17 | 5% Gold 95% Platinum sheet | 20+ | 570/16 min | Very good. |
| 18 | Vitreous Carbon block | 21+ | 570/4 min | Very good. |
| 19 | Silicon Carbide Block | 4+ | 570/4 min | Good slight edge sticking and suspect uneven pressing causes very high local pressures and sticking. |
| 20 | Silicon Aluminium Oxynitride block | 2+ | 570/4 min | Good |
| 21 | Boron Carbide block | 4+ | 570/4 min | Good |
| 22 | Silicon Nitride block | 2+ 2+ | 570/4 min 610/4 min | Good Poor (high spots sticking - locally very high pressures). |
| 23 | Tungsten | 3+ | 570/4 min | Good |

TABLE 2-continued

| Example | Material | No. of times pressed | Top temperature (as set) | Non-Stick Properties |
|---|---|---|---|---|
| 24 | sheet Tungsten Carbide (Nuloy N-1) Contains 5.5% Cobalt block) | 11+ | 570/4 min | Good |
| 25 | Molybdenum foil | 15+ | 570/4 min 650/2 min | Good |
| 26 | 1% Gold 99% Rhodium | 14+ | 595-675/ 4 min | Very Good |

It will be seen that we were able to achieve repeated pressings with some stamper materials. Not all the materials in table 2 were tested to destruction. The temperature of 675° C. in example 26 corresponds to a log viscosity of 8.5.

There are four classes of technical problem which render the stamper unusable after a limited number of pressings. In some cases the stamper sticks to the glass. It is thought that this occurs because of alkali metal diffusion from the glass to the stamper. In other cases the coating layer on the stamper degrades physically. This may be because the stamper material is not sufficiently robust to stand up to the stamping operating conditions or it may be a symptom of some form of chemical decomposition of the coating material. In a third category the stamper oxidises and the oxide layer is transferred to the glass, thereby ruining the quality of the microstructure transferred. These stampers are in themselves reusable, but do not produce quality microstructures. In a fourth category grain growth occurs in metal stampers. This is caused by the temperature to which the stamper is subjected and becomes worse with time. The effect of the grain growth is to change the microstructure produced by the stamper in an unsatisfactory way. For this reason it is not desirable to use a metal surface to impress the glass when repeated use of the stamper is required.

Some experiments were conducted to see whether coated glass would give better resistance to sticking caused by alkali metal diffusion. We tried using glass coated with a thin layer of silica and noted some slight improvement in the resistance to sticking. By silica layer we mean a layer that comprises mainly silica. The silica layer is probably fractured during the pressing operation so that it is not continuous at the time that the stamper is being removed. Such a silica layer would therefore not serve to completely prevent sodium ion diffusion which has been identified as a problem in degredation of the recording layer. A further continuous layer would have to be applied in order to guarantee that a barrier against sodium ion diffusion had been obtained.

EXAMPLE 27

Example 7 was repeated in a 10% hydrogen/nitrogen atmosphere using glass coated with a thin layer of silica. The temperature of the glass was 615° C., and a pressure of 180 kg/cm² was applied for 4 minutes. Good transfer of microstructure was obtained and the stamper was able to be used 3 times before it stuck, thus demonstrating an improvement over the use of uncoated glass.

EXAMPLE 28

A Si-N stamper was prepared in accordance with Example 8 and pressed into silica coated glass at a temperature of 635° C. for 4 minutes. The pressure used was 60 kg/cm². The stamper could only be used once before it stuck.

EXAMPLE 29

A nickel stamper such as that used for example 16 was impressed into silica coated glass at a temperature of 615° C. for 4 minutes. The pressure used was 180 kg/cm². Surprisingly the stamper was still reusable after 13 pressings, although the quality of the microstructure obtained was becoming unacceptable due to grain growth.

EXAMPLE 30

A silicon carbide stamper such as that which gave good results in example 19 was pressed into silica coated glass at 645° C. for 4 minutes. The pressure used was 60 kg/cm². The use of silica coated glass appeared to give a slight advantage and this stampler could be reused five or more times on such glass.

All the Examples with silica coated glass used a 10% hydrogen/nitrogen atmosphere. A further set of experiments was then conducted to see whether another type of coated glass would reduce the problem of sticking of the stamper. Carbon coated glass was selected for these experiments. Again a 10% hydrogen/nitrogen atmosphere was used for each example.

EXAMPLE 31

The silicon stamper used for Example 7 was pressed into carbon coated glass at 655° C. for 4 minutes. A pressure of 60 kg/cm² was used. The stamper stuck slightly after one pressing and completely after the third pressing.

EXAMPLE 32

A Si-N stamper was pressed into carbon coated glass at 635° C. for 4 minutes, with a pressure of 60 kg/cm². The stamper stuck after a single pressing.

EXAMPLE 33

A titanium nitride stamper such as that used for example 15 was pressed into carbon coated glass at a temperature of 615° C. for 4 minutes. The pressure used was 180 kg/cm². The stamper stuck after a single pressing.

Measurement of the oxygen concentration in the 10% hydrogen/nitrogen atmosphere used for the previous examples revealed that ingress of oxygen was leading to residual concentrations as high as 0.3%. In an attempt to reduce this level still further the pressing equipment was encased in a graphite surround system to prevent access of gas to the stamper and possibly to enhance oxygen reduction. Oxygen levels as low as 0.1% were found to be obtainable with this graphite surround system when used in conjunction with the 10% Hydrogen/Nitrogen atmosphere. Some of the earlier experiments were repeated to see if the reduced oxygen level affected the sticking of the stamper. The results are summarised in Table 3. All these examples used glass at a temperature of 615° C. and pressed at 180 kg/cm² for 4 minutes.

TABLE 3

| Example | Material | Type of glass | No. of times pressed before stick |
|---|---|---|---|
| 34 | Si | uncoated | 0 |
| 35 | Ni | " | 30+ |
| 36 | Si—N | " | 1 |
| 37 | Si—O | " | 0 |
| 38 | Ti—N | " | 2 |
| 39 | Si | carbon coated | 30+ |
| 40 | Si—N | " | 26+ |
| 41 | Si—O | " | 9+ |
| 42 | Ti—N | " | 4 |
| 43 | Si | silica coated | 10+ |

Example 34 shows that there is no advantage in this reduction of oxygen level for silicon stampers. However, example 35 demonstrates that considerable advantage was obtained for the nickel stamper. Examples 36-38 show little or no advantage for Si—N, Si—O or Ti—N stampers when used on uncoated glass in this lower oxygen concentration.

To our surprise considerable improvements were seen in example 39 when a silicon stamper was pressed into carbon coated glass in the reduced oxygen concentration atmosphere. Even more surprisingly a Si—N stamper gave good results in example 40. Smaller, but still significant, improvements were obtained for Si—O and Ti—N in examples 41 and 42. We conclude that the lower oxygen concentration reduced the burning off of the carbon coating due to oxidation at high temperature. The benefit of the more intact coating that results appears to vary according to the material being used for stampling.

For example 43 we repeated example 39 using silica coated glass instead of carbon coated glass. Once again the stamper could be re-used more times than a silicon stamper used in either a 0.1% oxygen atmosphere (as in example 34) or on silica coated glass in a 10% $H_2/N_2$ atmosphere (as in example 26). This shows that there is a synergistic effect when coated glass is combined with very low oxygen concentrations. As explained previously the way that the silica coating is thought to function is that it provides a barrier to sodium ion diffusion, which can give rise to sticking. It is probable that carbon also provides a barrier layer. Carbon may also reduce liability to stick by providing some lubrication between the stamper and the glass. Those skilled in the art will readily appreciate that other coatings could be used to provide either or both of these functions.

In some of our experiments where high spots either on the glass or the stamper which led to fracture of the glass under pressure or damage to the stamper. The use of extremely flat glass would overcome this difficulty. Such very flat glass is already used or proposed to be used for conventional optical disk manufacturing processes.

Selection of a log viscosity in the range specified by this invention ensures that typical sheet glasses are always above their annealing temperature during the stamping operation (the annealing temperature of a typical sheet glass corresponds to a log viscosity of 13.5). It will readily be appreciated that in the case where the stamper and the glass are being cooled together any differential expansion will cause the stamper to contract to a greater or lesser extent than the glass. This is obviously undesirable because the microstructure may be damaged. It is therefore necessary either to choose stamper materials which have characteristics which match the thermal expansion coefficient of the glass and hence allow both to cool pressed in contact or to separate the stamper and glass before cooling. Because it is not easy to find stamper materials with thermal expansion coefficients matched to glass it is preferable to separate the stamper from the glass before cooling the glass. Advantages are obtained by using a stamper which has been heated to a temperature slightly hotter than the bulk temperature of the glass. This causes a localised decreas in viscosity at the surface of the glass. The result of this is that the glass flows into the micro cavities in the stamper more easily, but then cools down to the point where surface tension effects are not so pronounced. The use of large temperature differentials between the stamper and the glass would not be appropriate for optical disk production because the sudden expansion of the glass would cause smearing of the microstructure being formed thereon and will probably give rise to a curved and distorted disk. In general we have found it better to operate at a higher viscosity (lower temperature) and use a high pressure to obtain good microstructures.

To show that log viscosity is an appropriate way to describe the scope of the present invention examples 44-47 use a lead-flint glass of the following composition:

| | |
|---|---|
| SiO | 63.6 wt % |
| PbO | 23.1 |
| K O | 6.0 |
| Na O | 7.0 |
| As O | 0.3 |

For each example the glass was pressed at a temperature of 475° C., which corresponds to a log viscosity of 10.6. The results are given in table 4. In each example the pressure applied was 180 kg/cm² for 4 minutes.

TABLE 4

| Example | Material | Type of Glass | No. of times pressed before sticking |
|---|---|---|---|
| 44 | Si | uncoated lead flint | 0 |
| 45 | Si—N | " | 0 |
| 46 | Si | carbon coated lead flint | 4+ |
| 47 | Si—N | " | 4+ |

Examples 44-47 were all carried out using a combination of 10% $H_2/N_2$ atmosphere and the graphite surround system to give very low oxygen concentrations in the vicinity of the stamping operation. Even so, it can be seen from examples 44 and 45 that neither silicon, nor silicon nitride stamper would work until they were used with carbon coated lead flint glass in examples 46 and 47. The examples and experiments described thus far relate to determination of the feasibility of reproducing a surface microstructure on a sheet of glass and using a stamper repeatedly to give such reproduction. The next stage was to devise a practical system for mass producing optical disks with such a surface microstructure. Conventionally, if a glass substrate is being used for an optical disk and if it is not to be etched, the process consists of cutting the disk from a sheet of flat glass and doing any necessary edgework to the cut disk, cleaning the disk, chemically strengthening the disk and subsequently washing it before inspecting it and packing it ready for sale. We have made the following modification to the process in order to obtain glass disks with tracking grooves already formed on their surface.

After the disk has been cut and cleaned, but before it goes forward for chemical strengthening, we inspect the disk and load it onto a base plate which is then heated up in stages to the working temperature. If it is desired to use coated glass and the cut and cleaned glass is uncoated, then it is necessary to coat the glass before it is heated, for example a carbon coating could be applied to the glass at that time. Then, to avoid degradation of the carbon coating the coated glass is kept in a low oxygen atmosphere at least whilst it is at an elevated temperature. The low oxygen atmosphere may be a Hydrogen/Nitrogen mixture, an inert gas or a mixture of these which may be of less than atmospheric pressure, or a vacuum. The important thing being to keep the oxygen level very low (less than 0.3%). Graphite surrounds can also contribute to this task. This working temperature corresponds to the log viscosity in the range 9.5 to 11 poises, although it is possible to operate slightly outside this range provided that the pressing time and pressure are adjusted accordingly. The loading operation and all subsequent operations are carried out in a clean room or clean tunnel and all the operations are capable of being fully automated. The loaded base plates are kept at the working temperature for sufficient time for the glass disk to assume a uniform temperature profile. They are then transferred to a press station through an airlock which contains the inert or reducing atmosphere within the press station which is designed to prevent oxidation of the stamper. The stamper is then pressed into the surface of the glass disk for less than 2 minutes and then removed again. The stamper is then cleaned and is ready to press another disk. The pressed disk is removed from the press station via an airlock, it is then annealed and cooled in stages to maintain its flatness. We prefer to hold the pressed disk between plates so that the glass is not able to bend whilst it cools. In addition to the heating before entry to the press station, we prefer to apply heat whilst the disk is in the press station and we have used induction heating for this purpose. Other methods of heating e.g. radiative, cartridge heating could be used. The cooled disk is unloaded from the base plate and inspected whereupon the base plate goes forward for cleaning and re-cycling to the beginning of the process where it is loaded with another disk. The inspected disk is then sent forward for chemical strengthening and the process continues in the conventional manner from this point.

A typical optical glass disk has a grooved area which extends from a 30 to 60 mm radius. It is necessary to use a press with a capacity of approximately 20-50 tonnes in order to obtain the desired results over this area.

Known glass pressing operations are utilised for forming shapes which have smooth surfaces but which are bent or shaped on a macroscopic scale. Such items include lenses. One problem that we have had to overcome in applying stamping technology to the formation of microstructures, is that it is difficult to separate the stamper and the glass after the stamping operation has occured. In the case of optical disks it is possible to overcome this difficulty by applying force to the non-grooved areas at the centre and the periphery of the disk.

It will be obvious to those skilled in the art that there are many variations possible on this technique. Furthermore it will be clear that this method of forming grooves on a glass surface could equally be well adapted to form fresnel lenses, diffraction gratings, anti-reflection coatings and other articles which have a microstructure which must be accurately formed on the surface of a glass. Furthermore the technique can be applied to glass of any thickness, although care must be taken to ensure that the temperature of the glass is sufficiently uniform to avoid stresses high enough to cause fracture when thicker glass is being used.

We claim:

1. A method of producing a surface microstructure on glass comprising providing glass to be stamped and characterised in that the glass is heated to a surface temperature corresponding to a viscosity of from $10^8$ to $10^{13}$ poise, the glass is supported and then pressed with a stamper heated to above the temperature of the glass, so that a microstructure on the heated stamper deforms the surface of the glass to give a corresponding microstructure which, when separated from the stamper and cooled in a controlled manner, gives the desired surface microstructure on the glass.

2. A method according to claim 1 in which the glass is supported in a low oxygen atmosphere while the stamper is pressed into it.

3. A method according to claim 2 in which the oxygen level is less than 0.3%.

4. A method according to claim 1 in which the glass is coated.

5. A method according to claim 1, in which the glass is separated from the stamper before any substantial cooling occurs.

6. A method according to claim 1 in which the thermal expansion coefficient of the stamper is about the same as the thermal expansion coefficient of the glass.

7. A method according to claim 1 in which the glass is heated to a surface temperature corresponding to a viscosity of from $10^{9.5}$ to $10^{11}$ poise.

8. A method according to claim 1 in which the microstructure on the heated stamper deforms the surface of the glass to give a corresponding microstructure of substantially identical dimensions to the microstructure on the stamper.

9. A method of producing a surface microstructure on glass comprising providing glass to be stamped and characterised in that the glass is heated to a surface temperature corresponding to a viscosity of from $10^8$ to $10^{13}$ poise, the glass is supported and then pressed at a pressure greater than 120 kg per square cm with a stamper heated to within $\pm 10°$ C. of the temperature of the glass, so that a microstructure on the heated stamper deforms the surface of the glass to give a corresponding microstructure which, when separated from the stamper and cooled in a controlled manner, gives the desired surface microstructure on the glass.

10. A method according to claim 9 in which the stamper is heated to a temperature higher than that of the glass.

11. A method of producing a surface microstructure on glass comprising providing glass to be stamped and characterised in that glass is coated and is heated to a surface temperature corresponding to a viscosity of from $10^8$ to $10^{13}$ poise, the glass is supported and then pressed with a stamper heated to within $\pm 10°$ C. of the temperature of the glass, so that a microstructure on the heated stamper deforms the surface of the glass to give a corresponding microstructure which, when separated from the stamper and cooled in a controlled manner, gives the desired surface microstructure on the glass.

12. A method according to claim 11 in which the glass is coated with a layer which substantially prevents ion diffusion.

13. A method according to claim 12 in which the coating also acts as a lubricant.

14. A method according to claim 13 in which the coating is carbon.

15. A method according to claim 12 in which the coating is silica.

16. A method of producing an optical disk substrate having tracking grooves from a pre-formed sheet of flat thin glass comprising providing a pre-formed sheet of flat thin glass and characterised in that the glass is heated to a temperature corresponding to a viscosity of from $10^8$ to $10^{13}$ poise, supported in a low oxygen atmosphere and impressed with a stamper heated to within $\pm 10°$ C. of the temperature of the glass for a predetermined time and at a predetermined pressure, so that a microstructure on the heated stamper deforms the surface of the glass to give a corresponding microstructure on the surface of the glass, whereupon the glass is separated from the stamper before any substantial cooling occurs and cooled in a controlled manner to give the desired tracking grooves on the optical disk substrate.

17. A method according to claim 16 in which the stamper is non-metallic.

18. A method according to claim 16 in which the optical disc substrate is formed from coated glass.

19. A method according to claim 18 in which the glass is coated with a layer which substantially prevents ion diffusion.

20. A method according to claim 19 in which the coating also acts as a lubricant.

21. A method according to claim 20 in which the coating is carbon.

22. A method according to claim 19 in which the coating is silica.

23. A method according to claim 16 in which the glass is about 1 to 2 mm thick.

24. A method according to claim 16 in which the stamper is heated to a temperature higher than that of the glass.

25. A method according to claim 16 in which the glass is heated to a surface temperature corresponding to a viscosity of from $10^{9.5}$ to $10^{11}$ poise.

26. A method according to claim 16 in which the predetermined pressure is greater than 120 kg per square cm.

27. A method according to claim 16 in which the predetermined time is less than 2 minutes.

28. A method according to claim 16 in which the microstructure on the heated stamper deforms the surface of the glass to give a corresponding microstructure of substantially identical dimensions to the microstructure on the stamper.

29. A method according to claim 16 in which the oxygen concentration is less than 0.3%.

* * * * *